United States Patent
Künzler et al.

(10) Patent No.: US 7,147,326 B2
(45) Date of Patent: *Dec. 12, 2006

(54) LENS WITH COLORED PORTION AND COATED SURFACE

(75) Inventors: Jay F. Künzler, Canandaigua, NY (US); Gary D. Friends, Ontario, NY (US); Daniel M. Ammon, Rochester, NY (US); Joseph A. McGee, DeWitt, NY (US); Michael G. Gartley, North Chili, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 11/332,006

(22) Filed: Jan. 13, 2006

(65) Prior Publication Data

US 2006/0114409 A1    Jun. 1, 2006

Related U.S. Application Data

(63) Continuation of application No. 10/187,153, filed on Jun. 28, 2002, now Pat. No. 7,021,761.

(51) Int. Cl.
 *G02C 7/04* (2006.01)
(52) U.S. Cl. ...................... 351/162; 351/177
(58) Field of Classification Search ................ 351/162, 351/177, 160 R, 160 H, 161
See application file for complete search history.

(56) References Cited

U.S. PATENT DOCUMENTS

| | | | | |
|---|---|---|---|---|
| 3,008,920 | A | 11/1961 | Urchick | 260/45.5 |
| 3,070,573 | A | 12/1962 | Beck | 260/45.5 |
| 3,679,504 | A | 7/1972 | Wichterle | 156/62 |
| 4,143,949 | A | 3/1979 | Chen | 351/160 |
| 4,304,705 | A | 12/1981 | Heilmann et al. | 260/30.4 |
| 4,312,575 | A | 1/1982 | Peyman et al. | 351/160 |
| 4,378,411 | A | 3/1983 | Heilmann et al. | 428/500 |
| 4,485,236 | A | 11/1984 | Rasmussen et al. | 544/69 |
| 4,582,402 | A | 4/1986 | Knapp | 351/162 |
| 4,668,240 | A | 5/1987 | Loshaek | 8/507 |
| 4,695,608 | A | 9/1987 | Engler et al. | 525/308 |
| 4,857,072 | A | 8/1989 | Narducy et al. | 8/507 |
| 4,959,074 | A | 9/1990 | Halpern et al. | 427/2.28 |
| 5,018,849 | A | 5/1991 | Su et al. | 351/162 |
| 5,081,197 | A | 1/1992 | Heilmann et al. | 526/260 |
| 5,091,489 | A | 2/1992 | Heilmann et al. | 526/90 |
| 5,120,121 | A | 6/1992 | Rawlings et al. | 351/162 |

(Continued)

FOREIGN PATENT DOCUMENTS

EP    0392735    7/1996

(Continued)

OTHER PUBLICATIONS

U.S. Appl. No. 10/166,584, filed Jun. 7, 2002, Jani.

(Continued)

*Primary Examiner*—Scott J. Sugarman
(74) *Attorney, Agent, or Firm*—John E. Thomas

(57) ABSTRACT

A lens with a colored portion is composed of a lens-forming polymer having a front lens surface and a back lens surface. A colorant is applied to at least one of these surfaces, and these surfaces may be coated with a coating layer composed of a material different than the lens-forming polymer. In the case of a cosmetic contact lens, the colorant may be applied in an annular ring pattern corresponding to an iris, so that the colorant pattern masks and changes the apparent color of the natural iris when the contact lens is worn.

15 Claims, 1 Drawing Sheet

U.S. PATENT DOCUMENTS

| | | | |
|---|---|---|---|
| 5,177,165 A | 1/1993 | Valint, Jr. et al. | 526/245 |
| 5,260,000 A | 11/1993 | Nandu et al. | 264/2.1 |
| 5,464,667 A | 11/1995 | Kohler et al. | 427/577 |
| 6,200,626 B1 | 3/2001 | Grobe, III et al. | 427/2.24 |
| 6,213,604 B1 | 4/2001 | Valint, Jr. et al. | 351/177 |
| 6,428,839 B1 | 8/2002 | Kunzler et al. | 427/2.1 |
| 6,482,531 B1 | 11/2002 | Timmons et al. | 428/500 |
| 6,521,352 B1 | 2/2003 | Chabrecek et al. | 428/522 |
| 7,021,761 B1 * | 4/2006 | Kunzler et al. | 351/162 |
| 2002/0167640 A1 | 11/2002 | Francis et al. | 351/162 |
| 2002/0196409 A1 | 12/2002 | Jani | 351/162 |

FOREIGN PATENT DOCUMENTS

| | | |
|---|---|---|
| FR | 1499774 | 11/1966 |
| WO | WO 00/71613 | 11/2000 |
| WO | WO 01/40846 | 6/2001 |

OTHER PUBLICATIONS

Odian, Principles of Polymerization, 2$^{nd}$ Ed., John Wiley & Sons, p. 425-430 (1981).

Advances in Polymer Science, Springer-Verlag, Editor H.J. Cantow, et al., V45, 1982, pp. 17-63.

* cited by examiner

LENS WITH COLORED PORTION AND COATED SURFACE

This application is a continuation of Ser. No. 10/187,153, filed Jun. 28, 2002 now U.S. Pat. No. 7,021,761.

FIELD OF THE INVENTION

This invention relates a method of making lenses, especially contact lenses, having a colored portion and wherein the colored portion is covered by a coating layer.

BACKGROUND OF THE INVENTION

Various colored contact lenses are known in the art. One class of colored lenses includes "cosmetic" lenses useful for enhancing or changing the apparent color of the wearer's iris. Generally, these lenses include a colored iris section, and the colored contact lenses may include an optical correction, for example, a correction to accommodate farsightedness or nearsightedness of the wearer of the contact lens; alternately, the contact lenses may be provided with the colored iris section solely for cosmetic purposes.

Examples of such contact lenses are disclosed in U.S. Pat. No. 4,582,402. The colored contact lenses of these patents are produced by printing a colored pattern of dots over the iris section on an external surface of the lens. This process involves offset pad printing where a colorant is transferred to the lens surface from a printing pad. A problem of such colored contact lenses is that the surface on which the printed pattern is applied tends be relatively rough, i.e., the colored dots appear as raised bumps on the lens surface. Although it has been proposed to print such a pattern on either the front or back surface of a contact lens, in practice, such printed patterns on generally only printed on the front surface of the lens, such that the printed pattern is in contact with the inner eyelid instead of the cornea, to prevent irritation to the cornea when the contact lens is worn.

Other examples of such contact lenses are disclosed in U.S. Pat. No. 5,018,849. For these colored contact lenses, a translucent layer is formed between two layers of lens material, such that this translucent layer is not in contact with eye tissue when the lens is worn. However, a pattern of colorant is still applied to the external front surface of the lens, such that this colorant contacts the inner eyelid.

SUMMARY OF THE INVENTION

This invention relates to a lens, especially a contact lens, with a colored portion. The lens comprises a lens-forming polymer, a front lens surface, and a back lens surface.

According to various preferred embodiments, a colorant is applied to the front lens surface exterior or the back lens surface exterior, and the colorant and colorant-containing surface are coated with a coating layer composed of a material different than the lens-forming polymer. For example, the colorant is applied to the front lens surface exterior, and the coating layer covers the colorant and the front lens surface, and/or the colorant is applied to the back lens surface exterior, and the coating layer covers the colorant and the back lens surface.

The colorant may be applied in an annular ring pattern corresponding to an iris, for example, the colorant is opaque so as to mask and change the apparent color of the natural iris when the contact lens is worn.

Preferably, the coating layer is more hydrophilic, more biocompatible and/or more lubricious than the lens forming polymer. Additionally, it is preferred the coating layer has a smoother external surface than the lens surface having colorant applied thereto.

According to other embodiments, the invention provides a contact lens with a first colorant applied to the front surface exterior, and a back lens surface with a second, different colorant to the back surface exterior. Preferably, the exteriors of both surfaces are coated with a coating layer composed of a material different the said lens-forming polymer.

DETAILED DESCRIPTION OF VARIOUS PREFERRED EMBODIMENTS

Figure 1:
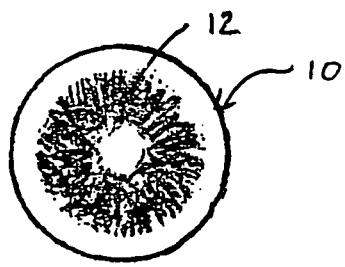
FIG. 1 is a schematic front view of a contact lens according to preferred embodiments of this invention.
Figure 2:
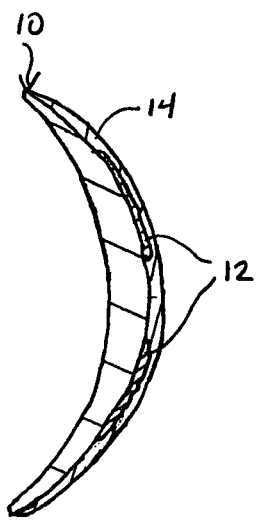
FIG. 2 is a cross-sectional view of the contact lens of FIG. 1.

FIGS. 1 and 2 illustrate a contact lens according to various preferred embodiments. Contact lens 10 includes an annular ring of colored pattern 12 generally corresponding to the iris of the eye when worn. For this embodiment, contact lens 10 is a cosmetic contact lens useful for enhancing or changing the apparent color of the wearer's iris. When the lens is designed for enhancing the color of the wearer's iris, the colored pattern is translucent; for example, a blue colored lens can make the iris of a light-eyed wearer appear bluer. When the iris is designed for changing the apparent color of the wearer's iris, the colored pattern is opaque so that it masks the natural color of the iris, for example, a blue colored lens can make the iris appear blue, even a dark-eyed wearer. The lens may include an optical correction, for example, a correction to accommodate farsightedness or nearsightedness, or the lens may lack an optical correction and be worn solely for cosmetic purposes.

A conventional contact lens material is hydrogel copolymers. A hydrogel is a crosslinked polymeric system that can absorb and retain water in an equilibrium state. Hydrogel copolymers are formed by polymerizing at least one hydrophilic monomer and a crosslinking agent (a crosslinker being defined as a monomer having multiple polymerizable functionalities). Representative, hydrophilic monomers include: unsaturated carboxylic acids, such as methacrylic acid and acrylic acid; (meth)acrylic substituted alcohols, such as 2-hydroxyethylmethacrylate and 2-hydroxyethylacrylate; vinyl lactams, such as N-vinyl pyrrolidone; and (meth)acrylamides, such as methacrylamide and N,N-dimethylacrylamide. Typical crosslinking agents include polyvinyl, typically di- or tri-vinyl monomers, such as di- or tri(meth)acrylates of diethyleneglycol, triethyleneglycol, butyleneglycol and hexane-1,6-diol; and divinylbenzene. A specific example of a hydrogel-forming monomer mixture is polymacon, composed primarily of 2-hydroxyethylmethacrylate with a small amount of diethyleneglycol dimethacrylate as a crosslinking monomer. Optionally, the monomer mixture may include a silicone-containing monomer in order to form a silicone hydrogel copolymer. Examples of silicone-containing monomers include: monomers including a single activated unsaturated radical, such as methacryloxypropyl tris(trimethylsiloxy)silane, pentamethyldisiloxanyl methylmethacrylate, tris(trimethylsiloxy)

methacryloxy propylsilane, methyldi(trimethylsiloxy)methacryloxymethyl silane, 3-[tris(trimethylsiloxy)silyl]propyl vinyl carbamate, and 3-[tris(trimethylsiloxy)silyl]propyl vinyl carbonate; and multifunctional ethylenically "end-capped" siloxane-containing monomers, especially difunctional monomers having two activated unsaturated radicals. A specific example of a silicone hydrogel-forming monomer mixture is balafilcon, based on N-vinyl pyrrolidone and the aforementioned vinyl carbonate and carbamate monomers, disclosed in U.S. Pat. No. 5,260,000. Many other lens-forming monomers and specific copolymers thereof are well known in the art.

Referring to FIG. 2, for the lens of this embodiment, the colored pattern 12 is applied to the front surface of lens 10. In the case of a hydrogel contact lens, the colored pattern is applied to the lens surface prior to hydrating the copolymer. The colored pattern may be applied according to the various methods known in the art. For example, the colored pattern may be applied to the lens surface according to the offset pad printing process. The formulation, applied to the lens surface, includes a colorant, such as a pigment having the form of solid particles or a dye, and a monomeric material. The terms "monomer" or "monomeric" denote materials that are polymerizable by free radical polymerization, such as compounds containing ethylenic unsaturation and including higher molecular weight monomeric materials often referred to as macromonomers. The monomeric material of the ink mixtures may include the aforementioned hydrophilic and/or crosslinking monomers commonly employed as lens-forming monomers; the ink monomeric material may be the same as a lens-forming monomer, or different monomers may be employed in the ink mixture and the lens-forming copolymer. The ink mixtures may optionally further comprise a solvent, a polymerization initiator, or a binding agent. The solvent may be employed in the ink mixture in order to obtain an ink mixture with a desired viscosity, or to assist with mixing of the colorant and monomeric material. The polymerization initiator may be included to facilitate polymerization of the monomeric material. The binding agent may be employed to facilitate binding of the colorant to the monomeric material. After applying the monomeric ink mixture to the lens surface, the ink monomeric mixture is cured, for example, by thermal and/or light polymerization, typically accomplished by exposing the monomeric material to heat and/or light radiation such as UV light. Alternate methods of binding a colorant to a lens surface are described in U.S. Pat. Nos. 4,668,240 and 4,857,072.

As another example, the pattern may be applied according to the method described in U.S. Pat. No. 5,120,121, the disclosure of which is incorporated herein by reference. The contact lenses of this patent are produced by applying a mixture of material to a contact lens front mold surface in a desired pattern. This mixture comprises lens-forming monomers, such as the aforementioned monomers used for hydrogel contact lenses, doped with a tint or colorant. Then, the mold and this mixture are subjected to polymerization conditions so as to partially or fully polymerize the pattern on the mold surface, followed by dispensing a conventional lens forming monomer mixture which does not contain tint or colorant into the mold such that it submerges the previously polymerized pattern, and polymerizing this mixture to obtain a contact lens.

Alternately, the colored pattern may be applied to the lens surface using an inkjet printer as disclosed in U.S. Ser. No. 10/166,584 (filed Jun. 7, 2002, "Lens With Colored Portion", D. Jani), the disclosure of which is incorporated herein by reference. Generally, such a method involves transferring a desired digitized image to a printable image that is then printed on a surface of the lens using an inkjet printer with nozzles that dispense several differently colored inks to the lens surface. The inks may be applied to the lens surface in the form of a polymerizable fluid, and then cured (or, polymerized) to bind to the lens surface. Representative inks are mixtures comprising a colorant, such as a pigment having the form of solid particles or a dye, and a monomeric material. Accordingly, the monomeric material of the ink mixtures may include the aforementioned hydrophilic and/or crosslinking monomers commonly employed as lens-forming monomers; the ink monomeric material may be the same as a lens-forming monomer, or different monomers may be employed in the ink mixture and the lens-forming copolymer. The ink mixtures may optionally further comprise a solvent, a polymerization initiator, or a binding agent, as described above. After applying the monomeric ink mixture to the lens surface, the ink monomeric mixture is cured, for example, by thermal and/or light polymerization, typically accomplished by exposing the monomeric material to heat and/or light radiation such as UV light.

After applying the colored pattern to the front surface of the contact lens, a coating layer 14 is applied over the colored pattern on the front surface of the contact lens. This coating layer serves to sandwich the colored pattern between the front lens substrate and this coating, thereby reducing roughness of the colored layer, and/or exposing the eye tissue to a more wettable or biocompatibile external lens surface. This coating layer may be applied according to the various methods known in the art. Optionally, a similar or different coating layer may be applied to the back surface of the lens.

As a first example, the coating layer may be formed according to the method described in U.S. Pat. No. 6,200,626, the disclosure of which is incorporated herein by reference. Generally, this method involves: (a) subjecting an oxidized surface of the lens to a plasma-polymerization deposition with an C1 to C10 saturated or unsaturated hydrocarbon to form a polymeric carbonaceous primary coating (or "carbon layer") on the lens surface; and (b) grafting a hydrophilic monomer onto the carbon layer by free-radical polymerization of the monomers to form a hydrophilic, biocompatible, secondary polymeric coating.

Step (a) involves a standard plasma oxidation and deposition processes (also referred to as "electrical glow discharge processes") to provide a thin, durable surface on the lens prior to the covalently bonded grafting of the hydrophilic polymeric coating in step (b). Such plasma processes are known in the art, and examples are provided in U.S. Pat. Nos. 4,143,949; 4,312,575; and 5,464,667, the disclosures of which are incorporated herein by reference. Plasma surface treatments involve passing an electrical discharge through a gas at low pressure. The electrical discharge may be at radio frequency (typically 13.56 MHz), although microwave and other frequencies can be used. Electrical discharges produce ultraviolet (UV) radiation, in addition to being absorbed by atoms and molecules in their gas state, resulting in energetic electrons and ions, atoms (ground and excited states), molecules and radicals. Thus, a plasma is a complex mixture of atoms and molecules in both ground and excited states, which reach a steady state after the discharge is begun. The circulating electrical field causes these excited atoms and molecules to collide with one another as well as the walls of the chamber and the surface of the material being treated.

The deposition of a coating from a plasma onto the surface of a material has been shown to be possible from high-energy plasmas without the assistance of sputtering (sputter-assisted deposition). Monomers can be deposited from the gas phase and polymerized in a low-pressure atmosphere (0.005 to 5 torr, preferably 0.01 to 1.0 torr) onto a substrate utilizing continuous or pulsed plasmas, suitably as high as about 1000 watts. A modulated plasma, for example, may be applied 100 milliseconds on then off. In addition, liquid nitrogen cooling has been utilized to condense vapors out of the gas phase onto a substrate and subsequently use the plasma to chemically react these materials with the substrate. However, plasmas generally do not require the use of external cooling or heating to cause the desired deposition.

Preferably, step (a) is preceded by subjecting the surface of the lens surface to a plasma oxidation reaction so as to more effectively bond the polymerized hydrocarbon coating to the lens and to resist delamination and/or cracking of the surface coating from the lens upon lens hydration. Thus, for example, if the lens is ultimately made from a hydrogel material that is hydrated (wherein the lens typically expands by ten to about twenty percent), the coating remains intact and bound to the lens, providing a more durable coating which is resistant to delamination and/or cracking. Such an oxidation of the lens may be accomplished in an atmosphere composed of an oxidizing media. It is preferred that a relatively "strong" oxidizing plasma is utilized for this oxidation, for example ambient air drawn through a five percent (5%) hydrogen peroxide solution. As an example, plasma oxidation may be carried out at an electric discharge frequency of 13.56 Mhz, preferably between about 20 to 500 watts at a pressure of about 0.1 to 1.0 torr, preferably for about 10 seconds to about 10 minutes or more, more preferably about 1 to 10 minutes. The contact lens can alternatively be pretreated by providing an aminated surface, by subjecting the lens to an ammonia or an aminoalkane plasma. Those skilled in the art will recognize other methods of improving or promoting adhesion for bonding of the subsequent, carbon layer. For example, plasma with an inert gas may also improve bonding.

Then, in step (a), a thin hydrocarbon coating is deposited on the lens, and in step (b), the carbon surface is exposed to, and reacted with, the hydrophilic monomer, or mixture of monomers including the hydrophilic monomer, under free-radical polymerization conditions, resulting in a hydrophilic polymer coating attached to the carbon surface.

In step (a), the lens surface is subjected to the plasma polymerization reaction in a hydrocarbon atmosphere to form a polymeric surface on the lens. Any hydrocarbon capable of polymerizing in a plasma environment may be utilized; however, the hydrocarbon generally should be in a gaseous state during polymerization and have a boiling point below about 200° C. at one atmosphere. Preferred hydrocarbons include aliphatic compounds having from 1 to about 15 carbon atoms, including both saturated and unsaturated aliphatic compounds. Examples include, but are not limited to, C1 to C15, preferably C1 to C10 alkanes, alkenes, or alkynes such as methane, ethane, propane, butane, pentane, hexane, ethylene, propylene, butylene, cyclohexane, pentene, acetylene. Also, C1 to C8 aromatics such as benzene, styrene, methylstyrene, and the like may be employed. As is known in the art, such hydrocarbon groups may be unsubstituted or substituted so long as they are capable of forming a plasma. Various combinations of different hydrocarbons may also be used.

The use of C1 to C4 hydrocarbons for the purpose of carbon-coating substrates is advantageous for its controllability in terms of thickness, deposition rate, hardness, etc. However, with respect to hydrogel materials, the C4 to C8 hydrocarbons (for example, butane, butene, isobutylene, and 1,3-butadiene) are advantageous, due to being relatively more flexible than coatings made from C1 to C3 hydrocarbons such as methane. Diolefins such as 1,3-butadiene or isoprene are particularly advantageous, resulting in coatings that are both flexible and expandable in water. More flexible coatings are especially preferred for "high-water" contact lenses that expand considerably upon hydration.

The hydrocarbon coating can be deposited from plasma, for example, in a low-pressure atmosphere (about 0.001 to 5 torr) at a radio frequency of 13.56 Mhz, at about 10 to 1000 watts, preferably 20–400 watts in about 30 seconds to 10 minutes or more, more preferably 30 seconds to 3 minutes. Other plasma conditions may be suitable as will be understood by the skilled artisan, for example, using pulsed plasma.

If the hydrocarbon coating provided is too thick, it can cause a haziness, resulting in a cloudy lens. Furthermore, excessively thick coatings can interfere with lens hydration due to differences in expansion between the lens and the coating, causing the lens to rip apart. Therefore, the thickness of the hydrocarbon layer should be less than about 500 Angstroms, preferably between about 25 and 500 Angstroms, more preferably 50 to 200 Angstroms, as determined by XPS analysis.

To form the polymer coating in step (b), an initiator may be employed to cause the ethylenically-unsaturated monomer to react with the surface. In any case, the carbon layer must be rendered reactive (activated) to promote covalent attachment. One advantage of diolefins to form the carbon layer is that unsaturated sites for the initiation of graft polymerization are already present. When employing other hydrocarbons to form the carbon layer, an activator or initiator may be employed to speed the free-radical graft polymerization of the surface. Alternately, conventional techniques for the initiation of graft polymerization may be applied to the carbon layer to create peroxy or other functional groups that can also initiate graft polymerization. For example, it is known in the art that various vinyl monomers can be graft polymerized onto polymer substrates which have been first treated with ionizing radiation in the presence of oxygen or with ozone to form peroxy groups on the surface of said substrate. See U.S. Pat. Nos. 3,008,920 and 3,070,573, for instance, for ozonization of the substrate. Alternatively, a carbon layer formed by plasma may already contain radicals that when exposed to air, form peroxide groups that decompose to oxygen radicals. Additional plasma/corona treatment is also capable of forming radicals for reaction with ethylenically-unsaturated monomers or polymers. Still another way to promote graft polymerization is to plasma treat the substrate, for example with argon or helium in plasma form, to form free radicals on its outmost surfaces, then contacting these radicals with oxygen to form hydroperoxy groups from the free radicals, followed by graft polymerizing ethylenically unsaturated monomers onto the surface.

The grafting polymer may be formed by using an aqueous solution of the ethylenically unsaturated monomer or mixture of monomers capable to undergoing graft addition polymerization onto the surface of the substrate. In those cases where one or more of the monomers is not appreciably soluble in water, a cosolvent such as tert-butyl alcohol may be used to enhance the solubility of the monomer in the aqueous graft polymerization system. The graft polymer may be the reaction product of a mixture of monomers comprising one or more hydrophilic monomers, including the aforementioned hydrophilic monomers employed as hydrogel copolymer lens-forming monomers. Specific examples of hydrophilic monomers for grafting to the carbon layer include aprotic types: acrylamides, such as N,N-dimethylacrylamide (DMA); vinyl lactams, such as N-vinylpyrrolidinone (NVP); and (meth)acrylated poly(alkylene oxides) such as methoxypolyoxyethylene methacrylates. Other specific examples include protic types: (meth)acrylic acid; and hydroxyalkyl(meth)acrylates, such as hydroxyethyl methacrylate (Hema). Hydrophilic monomers may also include zwitterions such as N,N-dimethyl-N-methacryloxyethyl-N-(3-sulfopropyl)-ammonium betain (SPE) and N,N-dimethyl-N-methacrylamidopropyl-N-(3-sulfopropyl)-ammonium betain (SPP). Optionally, some hydrophobic monomers may also be included with the hydrophilic monomer to impart desired properties such as resistance to lipid or protein deposition. Examples of hydrophobic monomers are alkyl methacrylate, fluorinated alkyl methacrylates, long-chain acrylamides such as octyl acrylamide, and the like. This monomeric mixture may be applied to the contact lens by dipping the front surface of the lens in the monomer mixture, or by spraying this mixture on the lens surface.

The graft polymerization of step (b) is typically carried out in the presence of a solvent. Determination of reactivity ratios for copolymerization are disclosed in Odian, *Principles of Polymerization,* 2nd Ed., John Wiley & Sons, p. 425–430 (1981), the disclosure of which is incorporated by reference herein. For example, the contact lens is exposed to the mixture of the reactive monomers in a suitable medium, for example, an aprotic solvent such as acetonitrile, for a suitable period of time. Suitable solvents are those which dissolve the monomers, including: water; alcohols such as lower alkanols, for example, ethanol and methanol; carboxamides such as dimethylformamide; dipolar aprotic solvents such as dimethyl sulfoxide or methyl ethyl ketone; ketones such as acetone or cyclohexanone; hydrocarbons such as toluene; ethers such as THF, dimethoxyethane or dioxane; halogenated hydrocarbons such as trichloroethane, and also mixtures of suitable solvents, for example mixtures of water and an alcohol, for example a water/ethanol or water/methanol mixture.

To promote the free-radical grafting, the lens substrate may optionally be immersed in a first solution containing an initiator followed by an immersion of the substrate in a second solution containing the hydrophilic monomer or mixture thereof. Typical polymerization initiators include free-radical-generating polymerization initiators of the type illustrated by acetyl peroxide, lauroyl peroxide, decanoyl peroxide, coprylyl peroxide, benzoyl peroxide, tertiary butyl peroxypivalate, sodium percarbonate, tertiary butyl peroctoate, and azobis-isobutyronitrile (AIBN). Ultraviolet free-radical initiators illustrated by diethoxyacetophenone can also be used. The curing process will of course depend upon the initiator used and the physical characteristics of the comonomer mixture such as viscosity. If an initiator is employed, it is typically present at a level within the range of 0.01 to 2 weight percent of the monomer mixture.

The resultant contact lens includes a coating layer of hydrophilic polymer attached to the lens surface via the carbon layer, such coating being hydrophilic and more biocompatible than the colorant layer.

As another example, the coating layer may be formed according to the method described in U.S. Ser. No. 09/315,306 (filed May 20, 1999) or PCT publication WO 00/71613), the disclosures of which are incorporated herein by reference. Generally, this method involves: (a) subjecting an oxidized surface of the lens to a plasma-polymerization deposition with an C1 to C10 saturated or unsaturated hydrocarbon to form a polymeric carbonaceous primary coating (or "carbon layer") on the lens surface; (b) forming reactive functionalities on the surface of the carbon layer; and (c) attaching hydrophilic polymer chains to the carbon layer by reacting the reactive functionalities on the carbon layer with complementary isocyanate or ring-opening reactive functionalities along a reactive hydrophilic polymer.

Step (a) of this coating process is similar to step (a) in the immediately aforementioned coating process, and similarly, is preferably preceded by subjecting the surface of the lens to a plasma-oxidation reaction so as to more effectively bond the polymerized hydrocarbon coating to the lens. In step (b), reactive functionalities are formed on the surface of the carbon layer to form the point of attachment for hydrophilic polymer chains. In step (c), the functionalized carbon surface is exposed to, and reacted with, hydrophilic reactive polymers, resulting in hydrophilic polymer chains attached to the carbon surface, rendering the carbon coating of step (a) hydrophilic. Any complementary reactive functionalities on the hydrophilic reactive polymer that remain unreacted, after attachment to the carbon surface at one or more locations, may be hydrolyzed as explained below. Preferably, on average the hydrophilic polymers become attached to the substrate surface at a plurality of points, therefore forming one or more loops on the surface.

Various methods are known in the art to attach a polymer chain to a carbon layer, including plasma oxidation or other means to provide surface reactive functional groups that can react with the polymer. Preferably, a nitrogen-containing gas is used to aminate, or form amine groups on, the carbon layer. However, oxygen or sulfur containing gases may alternately be used to form oxygen or sulfur containing groups, for example hydroxy or sulfide groups, on the carbon layer. Thus, the carbon layer is rendered reactive (functionalized) to promote the covalent attachment of the hydrophilic polymer to the surface.

To create an aminated carbon layer, the oxidation preferably utilizes a gas composition comprising an oxidizing media such as ammonia, ethylene diamine, C1 to C8 alkyl amine, hydrazine, or other oxidizing compounds. Preferably, the oxidation of the hydrocarbon layer is performed for a period of about 10 seconds to 10 minutes or more, more preferably 1 to 10 minutes, a discharge frequency of 13.56 Mhz at about 10 to 1000 watts, preferably 20 to 500 watts and about 0.1 to 1.0 torr.

The hydrophilic polymer, which is attached to the reactive functionalities on the carbon coating, may be the reaction product of monomers comprising one or more non-reactive hydrophilic monomers and one or more reactive functional monomers. In this case, the reactive functional monomeric unit will react with complementary reactive functionalities on the surface provided by the previous plasma oxidation. Such reactive functional monomers may include monomers containing one or more of the following groups: cyanate (—CNO); or various ring-opening reactive groups, for example, azlactone, epoxy, acid anhydrides, and the like.

The hydrophilic reactive polymers may be homopolymers or copolymers comprising reactive monomeric units that contain either an isocyanate or a ring-opening reactive functionality optionally. Although these reactive monomeric units may also be hydrophilic, the hydrophilic reactive polymer may also be a copolymer of reactive monomeric units copolymerized with one or more of various non-reactive hydrophilic monomeric units. Lesser amounts of hydrophobic monomeric units may optionally be present in the hydrophilic polymer, and in fact may be advantageous in providing a thicker coating by promoting the aggregation of the hydrophilic reactive polymer in solution. The ring-opening monomers include azlactone-functional, epoxy-functional and acid-anhydride-functional monomers.

Mixtures of hydrophilic reactive polymers may be employed. For example, the hydrophilic polymer chains attached to the carbonaceous layer may be the result of the reaction of a mixture of polymers comprising (a) a first hydrophilic reactive polymer having reactive functionalities in monomeric units along the hydrophilic polymers complementary to reactive functionalities on the carbonaceous layer and, in addition, (b) a second hydrophilic reactive polymer having supplemental reactive functionalities that are reactive with the first hydrophilic reactive polymer. A mixture comprising an epoxy-functional polymer with an acid-functional polymer, either simultaneously or sequentially applied to the substrate to be coated, have been found to provide relatively thick coatings.

Preferably the hydrophilic reactive polymers comprise 1 to 100 mole percent of reactive monomeric units, more preferably 5 to 50 mole percent, most preferably 10 to 40 mole percent. The polymers may comprise 0 to 99 mole percent of non-reactive hydrophilic monomeric units, preferably 50 to 95 mole percent, more preferably 60 to 90 mole percent (the reactive monomers, once reacted may also be hydrophilic, but are by definition mutually exclusive with the monomers referred to as hydrophilic monomers which are non-reactive). Other monomeric units which are hydrophobic optionally may also be used in amounts up to about 35 mole percent, preferably 0 to 20 mole percent, most preferably 0 to 10 mole percent. Examples of hydrophobic monomers are alkyl methacrylate, fluorinated alkyl methacrylates, long-chain acrylamides such as octyl acrylamide, and the like Hydrophilic monomers may be aprotic types, such as acrylamides vinyl lactones, and poly(alkylene oxides), or may be protic types such as (meth)acrylic acid or hydroxyalkyl(meth)acrylates. Hydrophilic monomers may also include zwitterions.

The weight average molecular weight of the hydrophilic reactive polymer may suitably range from about 200 to 1,000,000, preferably from about 1,000 to 500,000, most preferably from about 5,000 to 100,000.

As mentioned above, the hydrophilic reactive polymer may comprise monomeric units derived from azlactone-functional, epoxy-functional and acid-anhydride-functional monomers. For example, an epoxy-functional hydrophilic reactive polymer for coating a lens can be a copolymer containing glycidyl methacrylate (GMA) monomeric units which will react with amine reactive functionalities or the like on the carbon layer. Preferred examples of anhydride-functional hydrophilic reactive polymers comprise monomeric units derived from monomers such as maleic anhydride and itaconic anhydride.

In general, epoxy-functional reactive groups or anhydride-functional reactive groups in the hydrophilic reactive polymer react with the primary amine ($-NH_2$) groups or other reactive functionalities formed by plasma-oxidation on the carbon layer. Although amine reactive functionalities are preferred, oxygen-containing groups may be employed, preferably in the presence of an acidic catalyst such as 4-dimethylaminopyridine, to speed the reaction at room temperature, as will be understood by the skilled chemist. In general, azlactone or isocyanate-functional groups in the hydrophilic reactive polymers may similarly react with amines or hydroxy radicals, or the like, on the carbon layer.

Preferably, preformed (non-polymerizable) hydrophilic polymers containing repeat units derived from at least one ring-opening monomer or isocyanate-containing monomer are covalently reacted with reactive groups on the surface of the medical device such as a contact lens substrate. Typically, the hydrophilic reactive polymers are attached to the substrate at one or more places along the chain of the polymer. After attachment, any unreacted reactive functionalities in the hydrophilic reactive polymer may be hydrolyzed to a non-reactive moiety.

The hydrophilic reactive polymers are synthesized in a known manner from the corresponding monomers (the term monomer again also including a macromonomer) by a polymerization reaction customary to the person skilled in the art. Typically, the hydrophilic reactive polymers or chains are formed by: (1) mixing the monomers together; (2) adding a polymerization initiator; (3) subjecting the monomer/initiator mixture to a source of ultraviolet or actinic radiation and curing said mixture. Typical polymerization initiators include free-radical-generating polymerization initiators of the type illustrated by acetyl peroxide, lauroyl peroxide, decanoyl peroxide, coprylyl peroxide, benzoyl peroxide, tertiary butyl peroxypivalate, sodium percarbonate, tertiary butyl peroctoate, and azobis-isobutyronitrile (AIBN). Ultraviolet free-radical initiators illustrated by diethoxyacetophenone can also be used. The curing process will of course depend upon the initiator used and the physical characteristics of the comonomer mixture such as viscosity. In any event, the level of initiator employed will vary within the range of 0.01 to 2 weight percent of the mixture of monomers.

The polymerization to form the hydrophilic reactive polymer can be carried out in the presence of a solvent. Suitable solvents include water, alcohols such as lower alkanols, for example, ethanol and methanol; carboxamides such as dimethylformamide; dipolar aprotic solvents such as dimethyl sulfoxide or methyl ethyl ketone; ketones such as acetone or cyclohexanone; hydrocarbons such as toluene; ethers such as THF, dimethoxyethane or dioxane; halogenated hydrocarbons such astrichloroethane, and also mixtures of suitable solvents, for example mixtures of water and an alcohol, for example a water/ethanol or water/methanol mixture.

The carbon-coated contact lens may be exposed to the hydrophilic reactive polymer by immersing the lens substrate in a solution containing the polymer or by spraying the solution on the lens surface.

As indicated above, this coating method involves attaching reactive hydrophilic polymers to a functionalized carbon coating, which polymers comprise isocyanate-containing monomeric units or ring-opening monomeric units. The ring-opening reactive monomer may be an azlactone group represented by the following formula:

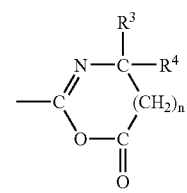

wherein $R^3$ and $R^4$ independently can be an alkyl group having 1 to 14 carbon atoms, a cycloalkyl group having 3 to 14 carbon atoms, an aryl group having 5 to 12 ring atoms, an arenyl group having 6 to 26 carbon atoms, and 0 to 3 heteroatoms non-peroxidic selected from S, N, and O, or $R^3$ and $R^4$ taken together with the carbon to which they are joined can form a carbocyclic ring containing 4 to 12 ring atoms, and n is an integer 0 or 1. Such monomeric units are disclosed in U.S. Pat. No. 5,177,165 to Valint et al.

The ring structure of such reactive functionalities is susceptible to nucleophilic ring-opening reactions with complementary reactive functional groups on the surface of the carbon layer or substrate being treated. For example, the azlactone functionality can react with primary amines, hydroxyl radicals or the like formed by plasma oxidation of the carbon layer, as mentioned above, to form a covalent bond between the substrate and the hydrophilic reactive polymer at one or more locations along the polymer. A plurality of attachments can form a series of polymer loops on the substrate, wherein each loop comprises a hydrophilic chain attached at both ends to the substrate.

Azlactone-functional monomers for making the hydrophilic reactive polymer can be any monomer, prepolymer, or oligomer comprising an azlactone functionality of the above formula in combination with a vinylic group on an unsaturated hydrocarbon to which the azlactone is attached. Preferably, azlactone-functionality is provided in the hydrophilic polymer by 2-alkenyl azlactone monomers. The 2-alkenyl azlactone monomers are known compounds, their synthesis being described, for example, in U.S. Pat. Nos. 4,304,705; 5,081,197; and 5,091,489 (all Heilmann et al.) the disclosures of which are incorporated herein by reference. Suitable 2-alkenyl azlactones include:

2-ethenyl-1,3-oxazolin-5-one,
2-ethenyl-4-methyl-1,3-oxazolin-5-one,
2-isopropenyl-1,3-oxazolin-5-one,
2-isopropenyl-4-methyl -1,3-oxazolin-5-one,
2-ethenyl-4,4-dimethyl-1,3-oxazolin-5-one,
2-isopropenyl-4,-dimethyl -1,3-oxazolin-5-one,
2-ethenyl-4-methyl-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl-4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-methyl-4-phenyl-1,3-oxazolin-5-one,
2-isopropenyl-4-methyl-4-benzyl-1,3-oxazolin-5-one, and
2-ethenyl-4,4-pentamethylene-1,3-oxazolin-5-one.

More preferably, the azlactone monomers are a compound represented by the following general formula:

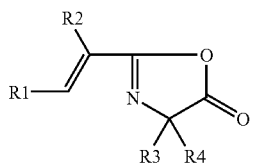

where $R^1$ and $R^2$ independently denote a hydrogen atom or a lower alkyl radical with one to six carbon atoms, and $R^3$ and $R^4$ independently denote alkyl radicals with one to six carbon atoms or a cycloalkyl radical with five or six carbon atoms. Specific examples include 2-isopropenyl-4,4-dimethyl-2-oxazolin-5-one (IPDMO), 2-vinyl-4,4-dimethyl-2-oxazolin-5-one (VDMO), spiro-4'-(2'-isopropenyl-2'-oxazolin-5-one) cyclohexane (IPCO), cyclohexane-spiro-4'-(2'-vinyl-2'-oxazol-5'-one) (VCO), and 2-(-1-propenyl)-4,4-dimethyl-oxazol-5-one (PDMO) and the like.

As indicated above, these ring-opening compounds can be copolymerized with hydrophilic and/or hydrophobic comonomers to form hydrophilic reactive polymers. After attachment to the desired substrate, any unreacted oxazolinone groups may then be hydrolyzed in order to convert the oxazolinone components into amino acids. In general, the hydrolysis step will follow the general reaction of:

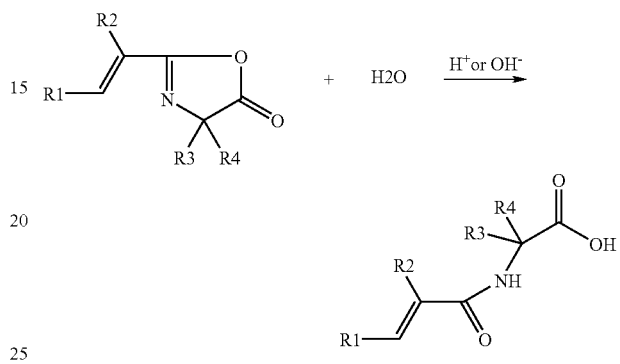

The carbon-carbon double bond between the $R^1$ and $R^2$ radicals is shown unreacted, but the reaction can take place when copolymerized into a polymer.

Non-limiting examples of comonomers useful to be copolymerized with azlactone functional moieties to form the hydrophilic reactive polymers used to coat a medical device include those mentioned above, preferably dimethylacrylamide, hydroxyethyl methacrylate (HEMA), and/or N-vinylpyrrolidone.

Such azlactone-functional monomers can be copolymerized with other monomers in various combinations of weight percentages. Using a monomer of similar reactivity ratio to that of an azlactone monomer will result in a random copolymer. Determination of reactivity ratios for copolymerization are disclosed in Odian, *Principles of Polymerization,* 2nd Ed., John Wiley & Sons, p. 425–430 (1981), the disclosure of which is incorporated by reference herein. Alternatively, use of a comonomer having a higher reactivity to that of an azlactone will tend to result in a block copolymer chain with a higher concentration of azlactone-functionality near the terminus of the chain.

Although not as preferred as monomers, azlactone-functional prepolymers or oligomers having at least one free-radically polymerizable site can also be utilized for providing azlactone-functionality in the hydrophilic reactive polymer according to the present invention. Azlactone-functional oligomers, for example, are prepared by free radical polymerization of azlactone monomers, optionally with comonomers as described in U.S. Pat. Nos. 4,378,411 and 4,695,608, incorporated by reference herein. Non-limiting examples of azlactone-functional oligomers and prepolymers are disclosed in U.S. Pat. Nos. 4,485,236 and 5,081,197 and European Patent Publication 0 392 735, all incorporated by reference herein.

Alternately, the ring-opening reactive group in the hydrophilic reactive polymer may be an epoxy functionality. The preferred epoxy-functional monomer is an oxirane-containing monomer such as glycidyl methacrylate, 4-vinyl-1-cyclohexene-1,2-epoxide, or the like, although other epoxy-containing monomers may be used. Exemplary comonomers are N,N-dimethylacrylamide and fluorinated monomers such as octafluoropentylmethacrylate.

The resultant contact lens includes a coating layer of hydrophilic polymer attached to the lens surface via the carbon layer, such coating being hydrophilic and wettable, and more biocompatible than the colorant layer.

As another example, the coating layer may be formed according to the method described in U.S. Pat. No. 6,213,604, the disclosure of which is incorporated herein by reference. Generally, this method involves: (a) subjecting the surface of the lens to a plasma oxidation reaction to create oxygen or nitrogen containing functional groups on the surface of the lens, in order to promote adhesion of the subsequent carbon coating; (b) subjecting the oxidized surface of the lens to a plasma polymerization deposition with a gas made from a diolefinic compound having 4 to 8 carbon atoms, in the absence of oxygen, thus forming a carbon layer on the surface on the lens; and (c) rendering the surface of the carbon coating hydrophilic and wettable to tear fluid by subjecting it to a second plasma oxidation.

This method utilizes standard plasma oxidation and deposition processes (also referred to as "electrical glow discharge processes") to provide a thin, durable, hydrophilic surface on the contact lens. With an oxidizing plasma, e.g., $O_2$ (oxygen gas), water, hydrogen peroxide, air, etc., ammonia and the like, the plasma tends to etch the surface of the lens, creating radicals and oxidized functional groups. When used as the sole surface treatment, such oxidation renders the surface of a lens more hydrophilic; however, the coverage of such surface treatment may be incomplete and the bulk properties of the silicone material remain apparent at the surface of the lens (e.g., silicone molecular chains adjacent the lens surface are capable of rotating, thus exposing hydrophobic groups to the outer surface). Hydrocarbon plasmas, on the other hand, deposit a thin carbon layer (e.g., from a few Angstroms to several thousand Angstroms thick) upon the surface of the lens, thereby creating a barrier between the underlying silicone materials and the outer lens surface. Following the deposition of a carbon layer on the lens to form a barrier, a further plasma oxidation will render the surface more hydrophilic.

Thus, the surface of the lens is first subjected to a plasma oxidation, prior to subsequent plasma polymerization to deposit a carbon layer, followed by a final plasma oxidation. The initial plasma oxidation in step (a) prepares the surface of the lens to bind the carbon layer that is subsequently deposited by plasma polymerization on the lens in step (b). This carbon layer or coating provides relatively complete coverage of the underlying silicone material. Step (c) renders the carbon coating of step (b) hydrophilic.

The initial plasma oxidation of the lens surface may be accomplished in an atmosphere composed of an oxidizing media, similar to the aforementioned coating methods. After this initial surface treatment, the oxidized lens surface is subjected to a plasma-polymerization reaction in a hydrocarbon atmosphere to form a polymeric (carbonaceous) surface on the lens. Diolefins having 4 to 8 carbon atoms, preferably 4 to 6 carbon atoms, are advantageous.

Following the deposition of the hydrocarbon layer on the lens, the lens is rendered wettable. One manner is to subject the carbon layer to a further plasma-oxidation reaction, thus forming a hydrophilic surface on the lens. The oxidation utilizes a gas composition of an oxidizing media such as air, water, hydrogen peroxide, $O_2$ (oxygen gas), ammonia, alkylamine, and the like, or combinations thereof, although a relatively weak oxidizing media is preferred, e.g., $O_2$ or water. The oxidation of the hydrocarbon layer is performed for a suitable period of time, preferably about 1–10 minutes, typically at a discharge frequency of 13.56 Mhz at 100 to 500 watts and about 0.1–1.0 torr.

The resultant contact lens includes an oxidized, hydrophilic coating layer attached to the lens surface, such coating being hydrophilic and wettable, and more biocompatible than the colorant layer.

As another example, the coating layer may be formed according to the method described in U.S. Ser. No. 09/586,941 (filed Jun. 2, 2002) or PCT Publication WO 01/94454, the disclosures of which are incorporated herein by reference. Generally, this method employs poly(acrylic) acid (PAA) surface complexation. Hydrogel contact lens copolymers containing polymerized hydrophilic monomers, for example DMA or NVP, are treated with water-based solutions containing PAA or PAA co-polymers to render a lubricious, stable, highly wettable PAA-based surface coating. The treatment may be performed at room temperature or under autoclave conditions. No additional oxidative surface treatment such as corona discharge or plasma oxidation is required. Surface coating materials include poly(vinylpyrrolidinone(VP)-co-acrylic acid(AA)), poly(methylvinylether-alt-maleic acid), poly(acrylic acid-graft-ethyleneoxide), poly(AA-co-methacrylic acid), poly(acrylamide-co-AA), poly(AA-co-maleic), and poly(butadiene-maleic acid). Generally, these coating materials contain carboxylic acid functionality. Particularly preferred polymers are characterized by acid contents of at least about 30 mole percent; preferably at least about 40 mole percent.

Solvents useful in the surface treatment (contacting) step of this method include solvents that readily solubilize proton donating solubes such as carboxylic acids. Preferred solvents include tetrahydrofuran (THF), acetonitrile, N,N-dimethyl formamide (DMF), and water. The surface treatment solution is preferably acidified before the contact step. The pH of the solution is suitably less than 7, preferably less than 5 and more preferably less than 4. For a discussion of the theory underlying the role of pH in complexation reactions in general, see *Advances in Polymer Science,* published by Springer-Verlag, Editor H. J. Cantow, et al, V 45, 1982, pages 17–63.

The surface treatment may generally consist of immersing the lens in the PAA-containing solution followed by a 30-minute autoclave cycle. In some cases, the complexation surface treatment is also effective at room temperature. The lenses are then rinsed in distilled water and re-autoclaved in a suitable buffer, for example a borate buffer.

The resultant contact lens has its external surface coated with the PAA coating layer, such coating being hydrophilic, wettable and lubricious, and more biocompatible than the colorant layer.

As mentioned, other coating methods known in the art may be employed.

Figure 3:
FIG. 3 is a cross-sectional view of an alternate embodiment of this invention.

FIG. 3 illustrates an alternate embodiment where the colorant-containing layer 12 is applied to the back surface of a contact lens 10, and the coating layer 14 is also applied to the lens back surface. Optionally, a similar coating layer may be applied to the front surface of the lens.

Figure 4:
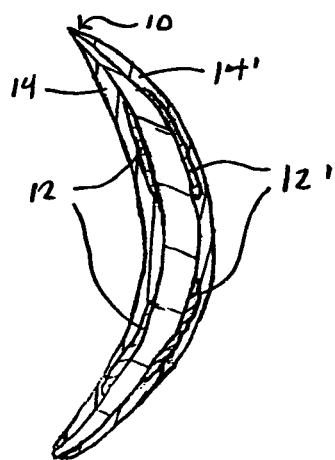
FIG. 4 is a cross-sectional view of another alternate embodiment of this invention.

FIG. 4 is a cross-sectional view of another alternate embodiment of this invention, where colorant 12, 12' are applied to both the back and front surface of the lens, and preferably, coating layers 14, 14' are also applied to both the back and front surfaces of the lens. The colorant layers 12 and 12' do not need to be the same. For example, one layer may be translucent and the other opaque. Alternately, these two colored patterns could be formed of different colors, for example, one pattern white or yellow and the other green. An advantage of this arrangement is that, because the two different colored patterns are separated by the lens substrate, the resultant combined pattern has more depth, thus more closely simulating a natural iris.

The described preferred embodiment has related to an iris image transferred to a contact lens surface for changing the apparent color of the contact lens wearer's iris. However, other embodiments are within the scope of this invention. As a first example, a novelty design image (such as the wearer's initials, a replica of a tattoo, a shamrock, etc.) may be transferred to the contact lens surface. As a second example, the ink monomeric mixture may include a photochromic dye that darkens or lightens in response to ambient light levels.

Many other modifications and variations of the present invention will be evident to the skilled practitioner in the field in view of the teachings herein. It is therefore understood that, within the scope of the claims, the present invention can be practiced other than as specifically described.

We claim:

1. A contact lens comprising a lens-forming polymer, a front lens surface, and a back lens surface, wherein a colorant is applied to the front lens surface exterior or the back lens surface exterior, and the colorant and colorant-containing surface are coated with a coating layer composed of a material different than said lens-forming polymer such that the coating layer covers the colorant and the colorant-containing surface, wherein the coating layer has a smoother external surface than the lens surface having colorant applied thereto.

2. The contact lens of claim 1, wherein the colorant is applied to the front lens surface exterior, and the coating layer covers the colorant and the front lens surface.

3. The contact lens of claim 1, wherein the colorant is applied to the back lens surface exterior, and the coating layer covers the colorant and the back lens surface.

4. The contact lens of claim 1, wherein the colorant is applied in a pattern corresponding to an iris.

5. The contact lens of claim 1, wherein the colorant is applied in an annular pattern corresponding to an iris.

6. The contact lens of claim 5, wherein the colorant is opaque so as to mask and change the apparent color of the natural iris when the contact lens is worn.

7. The contact lens of claim 1, wherein the lens-forming polymer is a hydrogel.

8. The contact lens of claim 1, wherein the coating layer is more hydrophilic than the lens-forming polymer.

9. The contact lens of claim 1, wherein the coating layer is more lubricious than the lens forming polymer.

10. A contact lens comprising a lens-forming polymer, a front lens surface with a first colorant applied to the front surface exterior, and a back lens surface with a second, different colorant to the back surface exterior, wherein the front lens surface and first colorant are coated with a front coating layer and the back lens surface and second colorant are coated with a back coating layer, said front and back coating layers composed of a material different than said lens-forming polymer, wherein the front and back coating layers have smoother external surfaces than the front and back lens surfaces having colorant applied thereto.

11. The contact lens of claim 10, wherein the one of the first and second colorants is translucent, and the other of the first and second colorants is opaque.

12. The contact lens of claim 10, wherein the first and second colorants are applied in a pattern corresponding to an iris.

13. The contact lens of claim 10, wherein the first and second colorants, in combination, form an annular ring pattern corresponding to an iris.

14. The contact lens of claim 13, wherein the first and second colorants, in combination, mask and change the apparent color of the natural iris when the contact lens is worn.

15. The contact lens of claim 10, wherein the front and back coating layers are more hydrophilic than the lens-forming polymer.

* * * * *